US012521327B2

(12) United States Patent
Sudo et al.

(10) Patent No.: US 12,521,327 B2
(45) Date of Patent: Jan. 13, 2026

(54) METHOD OF PRODUCING ALCOHOL COMPOSITION

(71) Applicant: SHIN-ETSU CHEMICAL CO., LTD., Tokyo (JP)

(72) Inventors: Takane Sudo, Joetsu (JP); Shingo Niinobe, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/467,274

(22) Filed: Sep. 6, 2021

(65) Prior Publication Data

US 2022/0071871 A1    Mar. 10, 2022

(30) Foreign Application Priority Data

Sep. 8, 2020   (JP) .................. 2020-150858

(51) Int. Cl.
*A61K 8/34*  (2006.01)
*A61K 8/73*  (2006.01)
*A61Q 17/00* (2006.01)

(52) U.S. Cl.
CPC ............... *A61K 8/345* (2013.01); *A61K 8/34* (2013.01); *A61K 8/731* (2013.01); *A61Q 17/005* (2013.01)

(58) Field of Classification Search
CPC ........ A61K 9/06; A61K 47/38; A61K 9/0034; A61K 47/10; A61K 31/07; A61K 31/122; A61K 31/167; A61K 31/192; A61K 31/337; A61K 31/407; A61K 31/59; A61K 31/704; A61K 31/7068; A61K 38/4893; A61K 47/34; A61K 2300/00; A61K 47/26; A61K 31/79; A61K 38/2013; A61K 45/06; A61K 9/0024; A61K 9/006; A61K 31/137; A61K 31/138; A61K 31/397; A61K 31/495; A61K 31/4985; A61K 31/724; A61K 31/445; A61K 9/0014; A61K 31/00; A61K 31/41; A61K 31/4178; A61K 31/4184; A61K 31/427; A61K 31/4418; A61K 31/443; A61K 31/4439; A61K 31/497; A61K 31/506; A61K 31/513; A61K 31/519; A61K 47/12; A61K 9/0031; A61K 2800/75; A61K 2800/782; A61K 2800/87; A61K 31/136; A61K 31/18; A61K 31/352; A61K 31/38; A61K 31/382; A61K 31/415; A61K 31/425; A61K 31/44; A61K 31/465; A61K 31/47; A61K 31/4709; A61K 31/473; A61K 31/505; A61K 31/522; A61K 33/16; A61K 33/30; A61K 47/02; A61K 47/32; A61K 47/36; A61K 47/44; A61K 8/0237; A61K 8/03; A61K 8/042; A61K 8/064; A61K 8/31; A61K 8/34; A61K 8/345; A61K 8/347; A61K 8/355; A61K 8/37; A61K 8/39; A61K 8/42; A61K 8/4973; A61K 8/731; A61K 8/735; A61K 8/92; A61K 9/0063; A61K 9/0095; A61K 9/107; A61K 9/1075; A61K 9/1635; A61K 9/1652; A61K 9/2018; A61K 9/2077; A61K 9/4858; A61K 9/4866; A61P 9/00; A61P 1/00; A61P 15/00; A61P 25/00; A61P 1/16; A61P 11/00; A61P 27/02; A61P 3/10; A61P 13/12; A61P 17/00; A61P 19/02; A61P 37/06; A61P 13/02; A61P 25/20; A61P 25/24; A61P 27/06; A61P 29/00; A61P 3/04; A61P 35/00; A61P 17/06; A61P 25/22; A61P 9/10; A61P 11/06; A61P 19/10; A61P 21/00; A61P 31/12; A61P 37/08; A61P 43/00; A61P 9/12; A61P 25/04; A61P 25/06; A61P 35/02; A61P 35/04; A61P 7/00; A61P 1/04; A61P 1/08;
(Continued)

(56) References Cited

U.S. PATENT DOCUMENTS 7,824,665 B2    11/2010  Miyamoto
2007/0065388 A1*  3/2007  Miyamoto .............. A61P 31/02
                                                    424/70.13
2013/0216624 A1   8/2013  Lee
(Continued)

FOREIGN PATENT DOCUMENTS

GB          1023895       3/1966
JP          H10-130173    5/1998
(Continued)

OTHER PUBLICATIONS

"Metolose TM—For Pharmaceutical : Shin-Etsu Cellulose", https://www.shinetsu.co.jp/cellulose/en/pharmaceutical/metolose.html (Year: 2002).*
TWI415860B, Hayakawa, Kazuhisa and Itoh, Rumiko, translation (Year: 2009).*
JP2011173823A translation (Year: 2011).*
(Continued)

*Primary Examiner* — Audrea B Coniglio
(74) *Attorney, Agent, or Firm* — JMB Davis Ben-David

(57) ABSTRACT

It is an objective of the present invention to provide a method of producing an alcohol composition that can adjust viscosity so as to achieve an appropriate viscosity while containing HPMC or MC as a thickening agent, even without including no step of heating treatment. The objective can be achieved by a method of producing an alcohol composition, including the steps of dispersing at least one water-soluble cellulose ether selected from the group consisting of HPMC and MC in a first alcohol to obtain a dispersion solution; mixing the dispersion solution with water and dissolving the water-soluble cellulose ether to obtain a dissolved solution; and mixing the dissolved solution with a second alcohol to obtain an alcohol composition.

9 Claims, No Drawings

(58) Field of Classification Search
CPC .... A61P 1/12; A61P 1/14; A61P 11/02; A61P 13/00; A61P 13/08; A61P 15/02; A61P 15/08; A61P 19/00; A61P 19/04; A61P 19/06; A61P 21/04; A61P 25/02; A61P 25/08; A61P 25/14; A61P 25/18; A61P 25/28; A61P 25/30; A61P 27/00; A61P 27/04; A61P 3/00; A61P 31/14; A61P 31/18; A61P 37/00; A61P 37/02; A61P 5/16; A61P 5/50; A61P 7/06; A61P 31/22
See application file for complete search history.

(56) References Cited

U.S. PATENT DOCUMENTS

| | | |
|---|---|---|
| 2015/0111972 A1 | 4/2015 | Knight |
| 2015/0197655 A1 | 7/2015 | Son et al. |
| 2022/0071869 A1 | 3/2022 | Sudo |

FOREIGN PATENT DOCUMENTS

| | | | | |
|---|---|---|---|---|
| JP | 2011173823 A | * | 9/2011 | |
| JP | 2016-166134 | | 9/2016 | |
| TW | I415860 B | * | 2/2009 | ............ D21H 5/143 |
| WO | 2006/085907 | | 8/2006 | |

OTHER PUBLICATIONS

Extended European Search Report of corresponding EP patent application; Patent Application No. EP 21195224.7 Date of Drafting: Feb. 18, 2022.
Office Action from JPO (English machine translation of Office Action), Patent Application No. JP2020-150858 Date of Drafting: Aug. 15, 2023.
"Hydroxypropylcellulose," in the Japanese Pharmacopoeia, eighteenth edition, 2021, available at https://www.pmda.go.jp/english/rs-sb-std/standards-development/jp/0029.html.
"Hypromellose" in the Japanese Pharmacopoeia, eighteen edition, 2021, available at https://www.pmda.go.jp/english/rs-sb-std/standards-development/jp/0029.html.
European Patent Office, Communication pursuant to Article 94(3) in corresponding EP Patent Application No. 21195224.7, Date of Issuance: Jan. 30, 2025, pp. 1-4, Germany.
Chinese Patent Office, Office Action Issued in Chinese Patent Application No. 202111044771.7, Date of Issuance: May 22, 2025, pp. 1-8.
Taiwanese Patent Office, Office Action Issued in Taiwanese Patent Application No. 110133381, Date of Issuance: Apr. 28, 2025, pp. 1-7.
Taiwanese Patent Office, Decision of rejection Issued in Taiwanese Patent Application No. 110133381, Date of Issuance: Sep. 1, 2025, pp. 1-4.

* cited by examiner

METHOD OF PRODUCING ALCOHOL COMPOSITION

CROSS-REFERENCE TO RELATED APPLICATION

The present application claims the benefit of priority to Japanese Patent Application No. 2020-150858, filed on Sep. 8, 2020, the contents of which are incorporated by reference herein in their entirety.

TECHNICAL FIELD

The invention relates to a method of producing an alcohol composition.

BACKGROUND ART

Alcohol compositions are widely used in industrial and domestic applications. Examples of such applications include hand sanitizers containing mono alcohols and water; and those containing polyhydric alcohols including pharmaceutical and food coolants, cosmetics such as hair gel, and aromatics. In this way, the alcohol compositions are used in various applications.

In particular, the demand for alcohol hand sanitizers increased dramatically in the year of 2020, and the alcohol hand sanitizers are widely used not only in medical and nursing cares, but also in households. For example, a highly viscous gel hand sanitizer has the advantages of being difficult to spill down from hands and being easy to carry around. In order to produce such a gel hand sanitizer, viscosity adjustment is required.

Thickening agents are used to adjust the viscosity of the alcohol composition, and examples of such thickening agents include acrylic polymers, polyvinyl alcohols, xanthan gum, and cellulose derivatives. For example, a known method of producing an alcohol composition makes use of acrylic polymers, xanthan gum and cellulose derivatives as thickening agents (see Patent Document 1).

In addition, the following methods using as a thickening agent hydroxypropyl methylcellulose (hereinafter also referred to as "HPMC") among cellulose derivatives have been reported: the method of dispersing HPMC in a mixture of ethanol, phosphoric acid, trisodium phosphate salt and glycerin to obtain a suspension followed by adding purified water to obtain a disinfectant (see Patent Document 2); and the method of dispersing HPMC in a mixture of warmed alcohol and water followed by letting the resulting dispersion solution stand to cool for 4 hours, and dissolving HPMC to obtain an alcohol composition (see Patent Document 3).

CITATION LIST

Patent Documents

Patent Document 1: JP 2008-508189 A
Patent Document 2 JP 2016-166134 A
Patent Document 3 JP 2015-524425 A

SUMMARY OF THE INVENTION

Problems to be Solved by the Invention

The methods described in Patent Documents 1 to 3 can produce an alcohol composition. However, the method described in Patent Document 1 has the problem that the resulting alcohol composition contains as little as 0.3% of thickening agent.

The method described in Patent Document 2 has the problem that the resulting alcohol composition contains HPMC with insufficient solubility and has a viscosity as low as 1,210 mPa·s. As a result, the method is difficult to adjust the viscosity.

The method described in Patent Document 3 requires heating treatment, which in turn requires manufacturing equipment for the treatment and cooling treatment after heating, thereby causing the problems of expanding the time and cost for carrying out the method.

The above problems are partly due to the fact that HPMC is insoluble in alcohols. As well, methylcellulose (hereinafter also referred to as "MC"), which is used as a thickening agent, is insoluble in alcohols. In other words, when attempting to prepare an alcohol composition containing HPMC or MC, and alcohol with a predetermined concentration by carrying out a different method from the methods described in Patent Documents 1 to 3, sufficient hydration cannot be caused during dissolution so that the resulting composition has low transparency and insufficient solubility. As a result, it is almost impossible to obtain an alcohol composition with a high viscosity.

In addition to these circumstances, in recent years, there has been a growing social awareness of the need to use sustainable resources with less environmental impact. Sustainable resource components including water-soluble cellulose ethers such as HPMC and MC are sustainable resource components, and their use encourages reduction in the use of synthetic polymers which is desirable from an environmental perspective. Therefore, there is a need for a method of producing an alcohol composition that avoids the problems caused by the methods described in Patent Documents 1 to 3, while using HPMC or MC as a thickening agent.

In view of the above circumstances, it is an objective of the present invention to provide a method of producing an alcohol composition that can carry out viscosity adjustment so as to achieve an appropriate viscosity while containing HPMC or MC as a thickening agent, even without including any step of heating treatment.

Means of Solving the Problems

In the course of extensive efforts to find a way to solve the above-identified problems, the present inventors have found that the alcohol composition with an appropriate degree of viscosity can be obtained with the use of water-soluble cellulose ethers which have a variety of properties and content, when carrying out the following steps in sequence in a step-by-step manner, even without heating treatment: dispersing water-soluble cellulose ethers such as HPMC and MC in a first alcohol to obtain a dispersion solution; mixing the dispersion solution with water to obtain a dissolved solution of water-soluble cellulose ethers; and mixing the dissolved solution with a second alcohol to obtain an alcohol composition. Based on the above findings, the present inventors have finally succeeded in inventing a method of producing an alcohol composition that includes the above steps. As such, the present invention has been completed on the basis of the findings and successful examples that were first found or obtained by the present inventors.

According to the present invention, there are provided a method of producing an alcohol composition and a kit in the following aspects:

[1] A method of producing an alcohol composition, including the steps of dispersing at least one water-soluble cellulose ether selected from the group consisting of hydroxypropyl methylcellulose and methylcellulose in a first alcohol to obtain a dispersion solution; mixing the dispersion solution with water and dissolving the water-soluble cellulose ether to obtain a dissolved solution; and mixing the dissolved solution with the second alcohol to obtain an alcohol composition.

[2] The method of producing an alcohol composition according to [1], wherein the ratio of the mass of the first alcohol relative to the total mass of the first and second alcohols ([first alcohol]/[first alcohol+second alcohol]) is equal to or less than 0.70.

[3] The method of producing an alcohol composition according to [1] or [2], wherein the first alcohol and/or the second alcohol is at least one alcohol selected from the group consisting of lower alcohols with 1 to 4 carbon atoms, and polyhydric alcohols.

[4] The method of producing an alcohol composition according to [1] or [2], wherein the first alcohol and/or the second alcohol is at least one alcohol selected from the group consisting of ethanol, isopropanol, and glycerin.

[5] The method of producing an alcohol composition according to [1] or [2], wherein the first alcohol and/or the second alcohol is ethanol, and the total content of alcohols is in the range between 60.0% by mass and 90.0% by mass.

[6] A kit for producing an alcohol composition, including at least one water-soluble cellulose ether selected from the group consisting of hydroxypropyl methylcellulose and methylcellulose, the first alcohol, and the second alcohol; and wherein the ratio of the mass of the first alcohol relative to the total mass of the first and second alcohols ([first alcohol]/[first alcohol+second alcohol]) is equal to or less than 0.70.

Effect of the Invention

According to the present invention, an alcohol composition with a desired viscosity, which allows the alcohol composition to become in the form of gel with an appropriate degree of viscosity, can be obtained with the use of environmentally friendly water-soluble cellulose ethers such as hydroxypropyl methylcellulose and methylcellulose without going through the step of heating treatment. Furthermore, according to the present invention, the resulting alcohol composition can be produced as one having a large content of alcohol so that the method can be useful as a method of producing a gel-type disinfectant alcohol composition.

DETAILED DESCRIPTION OF EMBODIMENTS

While a method of producing an alcohol composition (hereinafter also referred to as "method" simply) and a kit for producing an alcohol composition (hereinafter also referred to as "kit" simply) that form one embodiment of the present invention will now be described in detail, the present invention may take various forms to the extent that its objective can be achieved.

Unless otherwise specified, each term used herein is used in the meaning commonly used by those skilled in the art, and should not be construed to have any meaning that is unduly limiting. Also, any speculations and theories herein are made on the basis of the knowledge and experiences of the present inventors and as such, the present invention is not bound by any such speculations and theories.

While the term "composition" is not particularly limited and means any composition as well known, it is, for example, comprised of combination of two or more components.

The term "and/or" as used herein means either any one of, any combination of two or more of, or combination of all of listed related items.

The term "content" as used herein is synonymous with "concentration" and "amount used" ("amount added"), and means the proportion of the amount of a component relative to the total amount of a composition containing the component. Unless otherwise specified, the unit of content used herein indicates "% by mass" and "wt %". However, the total content of the components may not exceed 100%.

The wording "to" for indicating a range of values is intended to include both values preceding and following the wording; for example, "0% to 100%" means a range from 0% or more and 100% or less. The terms "more than" and "less than" used herein means the lower and upper limits without including a value following the term, respectively. For example, "more than 1" means a value beyond 1, and "less than 100" means a value below 100.

The terms "include," "comprise," and "contain" mean that an element(s) other than an element(s) as explicitly indicated can be added as inclusions, which are, for example, synonymous with "at least include," but encompasses the meaning of "consist of" and "substantially consist of". In other words, the terms may mean, for example, to include an element(s) as explicitly indicated as well as any one element or any two or more elements, to consist of an element(s) as explicitly indicated, or substantially consist of an element(s) as explicitly indicated. Such elements include limitations such as components, steps, conditions, and parameters.

The number of digits of an integer equals to its significant FIGURE. For example, 1 has one significant FIGURE and 10 has two significant FIGURES. For a decimal number, the number of digits after a decimal point equal to its significant FIGURE. For example, 0.1 has one significant FIGURE and 0.10 has two significant FIGURES.

The method according to one embodiment of the present invention includes a step of dispersing at least one water-soluble cellulose ether selected from the group consisting of hydroxypropyl methylcellulose and methylcellulose in a first alcohol to obtain a dispersion solution (hereinafter also referred to as a "step of obtaining dispersion solution"); a step of mixing the dispersion solution with water and dissolving the water-soluble cellulose ether to obtain a dissolved solution (hereinafter also referred to as a "step of obtaining dissolved solution"); and a step of mixing the dissolved solution with a second alcohol to obtain an alcohol composition (hereinafter also referred to as a "step of obtaining alcohol composition").

The terms "water-soluble cellulose ether" used herein means HPMC, MC, or a mixture of both of them.

The alcohol composition produced by the method according to one embodiment of the present invention contains water-soluble cellulose ethers such as HPMC and MC, water and alcohol, or even consists of these components. Due to such components of the alcohol composition, the method according to one embodiment of the present invention may be useful as a method of producing an alcohol disinfection composition, e.g., a gel-type alcohol disinfection composition.

<Step of Obtaining Dispersion Solution>

The step of obtaining dispersion solution is a step of dispersing hydroxypropyl methylcellulose, methylcellulose or both of them in a first alcohol to obtain a dispersion solution.

[First Alcohol]

The method according to one embodiment of the present invention is characterized in that alcohols are blended in two stages as the first and second alcohols. The first alcohol may be the same as the second alcohol, or may be different from the second alcohol. Alcohols are not particularly limited so long as they are compatible [miscible] with water. Examples of alcohols include lower alcohols with one to four carbon atoms, and polyhydric alcohols, particularly $C_2$-$C_6$ polyhydric alcohols.

Examples of lower alcohols with one to four carbon atoms include methanol, ethanol, 1-propanol, isopropanol, n-butyl alcohol, and tert-butanol. Examples of polyhydric alcohols include ethylene glycol, propylene glycol, 1,3-propanediol, dipropylene glycol, 1,3-butanediol, glycerin, diglycerin, and pentylene glycol. Among them, ethanol and isopropanol are preferable from the viewpoint of imparting disinfecting effect to the alcohol composition, and glycerin is preferable from the viewpoint of broad utility and imparting a moisturizing property to the alcohol composition.

Alcohols may be used either individually or in combination of two or more of such alcohols. For example, a mixture of lower alcohols with one to four carbon atoms and polyhydric alcohols may be used.

The alcohol content (total content of the first alcohol and the second alcohol) is not particularly limited, but may be set as appropriate according to the application of the alcohol composition so long as the content is within an amount that enables the water-soluble cellulose ether used to be dissolved.

For example, when the first and/or second alcohol is ethanol and/or isopropanol, from the viewpoint of solubility of the water-soluble cellulose ether, the content of ethanol and/or isopropanol is preferably in the range between 30.0% by mass and 95.0% by mass relative to the total mass of the alcohol composition, more preferably between 40.0% by mass and 95.0% by mass, and from the viewpoint of disinfection property of the alcohol composition, still more preferably between 50.0% by mass and 95.0% by mass, still even more preferably between 60.0% by mass and 90.0% by mass.

When the first and/or second alcohol is glycerin, diglycerin, or a mixture of glycerin and diglycerin, from the viewpoint of solubility of the water-soluble cellulose ether and moisturizing property of the alcohol composition, the content is preferably in the range between 20.0% by mass and 70.0% by mass relative to the total mass of the alcohol composition, more preferably between 20.0% by mass and 60.0% by mass, and still more preferably between 20.0% by mass and 50.0% by mass.

The content of the first alcohol is not particularly limited. On the other hand, in the method according to one embodiment of the present invention, a constant relationship between the mass of the first alcohol and the total mass of the first and second alcohols can improve dissolution stability of the water-soluble cellulose ether in the alcohol composition, and may lead to hydrate the water-soluble cellulose ether very well. In order to achieve sufficient hydration of the water-soluble cellulose ether, the ratio of the mass of the first alcohol relative to the total mass of the first and second alcohols ([first alcohol]/[first alcohol+second alcohol]); hereinafter also referred to as a "first alcohol content ratio") is preferably equal to or less than 0.70, and more preferably equal to or less than 0.61. If the ratio is more than 0.70, the water ratio in the dissolved solution becomes smaller in the subsequent step of obtaining dissolved solution so that the amount of water that can contribute to dissolution of the water-soluble cellulose ether may be insufficient. The resulting insufficient hydration may give rise to insufficient dissolution of the water-soluble cellulose ether, and the resulting alcohol composition may not exhibit the expected thickening property.

For example, if the mass of the first alcohol is 20.0% by mass, and the ratio of the mass of the first alcohol relative to the total mass of the first and second alcohols, i.e., the first alcohol content ratio is 0.267, the total mass of the alcohols is 75.0% by mass, and the mass of the second alcohol is 55.0% by mass.

The method according to one embodiment of the present invention includes dividing the alcohols employed into two parts, the first alcohol and the second alcohol, and dispersing the water-soluble cellulose ether in the first alcohol among them. This leads to hot water not being necessary for dispersing, which would otherwise be required to preliminarily prepare an aqueous solution of the water-soluble cellulose ether, so that neither heating treatment, nor cooling treatment in which the solution is cooled so as to become at the temperature to be equal to or less than the dissolution temperature after heating may be required, translating to reduced manufacturing time and power costs for the treatments.

[Hydroxypropyl Methylcellulose (HPMC)]

HPMC is a water-soluble cellulose ether formed by introducing methoxy and hydroxypropoxy groups into cellulose. HPMC is not particularly limited in terms of physical properties, such as the methoxy group content (the degree of substitutions of methoxy groups), the hydroxypropoxy group content (the molar substitutions of hydroxypropoxy groups), the viscosity and the molecular weight. HPMC may be selected as appropriate according to the viscosity and other properties to be imparted to the resulting alcohol composition. While the method of obtaining HPMC is not particularly limited, HPMC may be produced by known production methods or obtained as commercially available products.

One example of the method of producing HPMC can include the steps of reacting cellulose pulp with alkali to obtain an alkali cellulose, reacting the obtained alkali cellulose with hydroxypropyl etherifying agent and methylating agent to obtain a reactant, and then washing, drying, and pulverizing the obtained reactant to prepare a water-soluble hydroxypropyl methylcellulose.

The viscosity of HPMC is not particularly limited. For example, in order to impart the desired viscosity to the alcohol composition, the viscosity measured with a viscometer at 20° C. using a 2.0% by mass aqueous solution of HPMC is preferably in the range between 1,000 mPa·s and 120,000 mPa·s, more preferably between 1,500 mPa·s and 100,000 mPa·s, and still more preferably between 2,000 mP·s and 100,000 mPa·s. If the viscosity measured with a viscometer at 20° C. using a 2.0% by mass aqueous solution of HPMC is in the range between 1,000 mPa·s and 120,000 mPa·s, the resulting alcohol composition can have a viscosity at 20° C. which can take the gel form, liquid form, or other desired forms. Furthermore, if the viscosity measured with a viscometer at 20° C. using a 2.0% by mass aqueous solution of HPMC is less than 1,000 mPa·s, the thickening effect imparted to the alcohol composition may be weak, and the viscosity stability of the alcohol composition may not be sufficient. On the other hand, if the viscosity measured with a viscometer at 20° C. using a 2.0% by mass aqueous solution of HPMC is more than 120,000 mPa·s, HPMC may become incompatible with alcohols, resulting in poor solubility and consequently poor thickening property and/or poor transparency of the alcohol composition. The viscosity of 2.0% by mass aqueous HPMC solution at 20° C. is measured using a single cylinder-type rotational viscometer according to "2. Method II Viscosity measurement by rotational viscometer" in the Viscosity Determination in General Tests described in Japanese Pharmacopoeia, 17th edition, as described in Examples below.

The degree of substitution (DS) of methoxy groups in HPMC is preferably equal to or more than 1.00, more preferably in the range between 1.20 and 2.20, and still more preferably 1.3 and 2.1, from the viewpoint of compatibility with alcohols, dispersibility in alcohols, and viscoelasticity and transparency of the alcohol composition. The degree of substitutions (DS) of methoxy groups refers to the average number of methoxy groups per unit of anhydrous glucose.

The molar substitution (MS) of hydroxypropoxy groups in HPMC is preferably equal to or more than 0.1, more preferably in the range between 0.10 and 0.60, still more preferably 0.13 and 0.40, from the viewpoint of compatibility with alcohols, dispersibility in alcohols, and viscoelasticity and transparency of the alcohol composition. The molar substitutions (MS) of hydroxypropoxy groups refers to the average number of moles of hydroxypropoxy groups per mole of anhydrous glucose.

DS of methoxy groups and MS of hydroxypropoxy groups in HPMC are determined by converting the values measured by the measurement method for Hypromellose (Hydroxypropyl Methylcellulose) described in Japanese Pharmacopoeia, 17th edition.

The content of HPMC may be set as appropriate due to the desired thickening property to be imparted to the alcohol composition, but is not particularly limited. For example, the content of HPMC is preferably in the range between 0.05% by mass (m/m) and 4.0% by mass relative to the total mass of the alcohol composition, more preferably between 0.1% by mass and 3.8% by mass, still more preferably between 0.2% by mass and 3.5% by mass, and still even more preferably between 0.5% by mass and 3.0% by mass.

[Methylcellulose (MC)]

MC is a water-soluble cellulose ether formed by introducing methoxy groups into cellulose. MC is not particularly limited in terms of physical properties, such as the methoxy group content (the degree of substitutions of methoxy groups), the viscosity and the molecular weight. MC may be selected as appropriate according to the viscosity and other properties to be imparted to the resulting alcohol composition. While the method of obtaining MC is not particularly limited, MC may be produced by known production methods or obtained as commercially available products.

One example of the method of producing MC can include the steps of reacting cellulose pulp with alkali to obtain an alkali cellulose, reacting the obtained alkali cellulose with methylating agent to obtain a reactant, and then washing, drying, and pulverizing the obtained reactant to prepare a water-soluble methylcellulose.

The viscosity of MC is not particularly limited. For example, in order to impart the desired viscosity to the alcohol composition, the viscosity measured with a viscometer at 20° C. using a 2.0% by mass aqueous solution of MC is preferably in the range between 1,000 mPa·s and 50,000 mPa·s, more preferably between 1,500 mPa·s and 40,000 mPa·s, and still more preferably between 2,000 mP·s and 30,000 mPa·s. If the viscosity measured with a viscometer at 20° C. using a 2.0% by mass aqueous solution of MC is in the range between 1,000 mPa·s and 50,000 mPa·s, the resulting alcohol composition can have a viscosity at 20° C. which can take the gel form, liquid form, or other desired forms. Furthermore, if the viscosity measured with a viscometer at 20° C. using a 2.0% by mass aqueous solution of MC is less than 1,000 mPa·s, the thickening effect imparted to the alcohol composition may be too weak, and the viscosity stability of the alcohol composition may not be sufficient. On the other hand, if the viscosity measured with a viscometer at 20° C. using a 2.0% by mass aqueous solution of MC is more than 50,000 mPa·s, MC become incompatible with alcohols, resulting in poor solubility and consequently poor thickening property and/or poor transparency of the alcohol composition. The viscosity of 2.0% by mass aqueous MC solution at 20° C. is measured using a single cylinder-type rotational viscometer according to "2. Method II Viscosity measurement by rotational viscometer" in the Viscosity Determination in General Tests described in Japanese Pharmacopoeia, 17th edition, as described in Examples below.

The degree of substitutions (DS) of methoxy groups in MC is preferably in the range between 1.00 and 2.20, more preferably between 1.30 and 2.10, still more preferably between 1.50 and 2.00, from the viewpoint of compatibility with alcohols, dispersibility in alcohols, and viscoelasticity and transparency of the alcohol composition. The degree of substitutions (DS) of methoxy groups refers to the average number of methoxy groups per unit of anhydrous glucose.

The content of MC may be set as appropriate due to the desired thickening property to be imparted to the alcohol composition, but is not particularly limited. For example, the content is preferably in the range between 0.05% by mass and 4.0% by mass relative to the total mass of the alcohol composition, more preferably between 0.1% by mass and 3.5% by mass, still more preferably between 0.2% by mass and 3.0% by mass, and still even more preferably between 0.5% by mass and 2.2% by mass.

DS of methoxy groups in MC is determined by converting the value measured by the measurement method for Methylcellulose described in Japanese Pharmacopoeia, 17th edition.

However, when both HPMC and MC are used as water-soluble cellulose ethers, the total amount of water-soluble cellulose ethers may be set as appropriate, taking into account the above-mentioned ranges of HPMC and MC, and the thickening abilities and the solubility in alcohols of them.

[Process Conditions]

The conditions for dispersing the water-soluble cellulose ether in the first alcohol are not particularly limited. Examples of the conditions include conditions for dispersing a solid in a solvent as known in the art. For example, the dispersion solution can be obtained by contacting the first alcohol with the water-soluble cellulose ether followed by subjecting the resultant to mixing treatment such as stirring treatment to disperse the water-soluble cellulose ether in the first alcohol.

When stirring treatment is employed as mixing treatment, the stirring means are not particularly limited. Examples of stirring means include stirring means using stirring devices such as homogenizer, homomixer, homodisper, flowjet mixer, ultramixer, colloid mill, and three-one motor.

The stirring temperature is not particularly limited, but preferably in the range between 0° C. and 40° C., and more preferably between 0° C. and 35° C.; the stirring time is not particularly limited, but preferably in the range between 1 minute and 30 minutes, and more preferably between 5 minutes and 15 minutes.

In the step of obtaining dispersion solution, it is possible to say that a uniform dispersion has been obtained by visually confirming that there are virtually no clumps of water-soluble cellulose ether (agglomerates (mamako)), or no other parts of water-soluble cellulose ether that are in the pre-mixed state without being dispersed or that are agglomerated. The dispersion solution preferably remains in a homogeneous state for at least one hour after left to stand. The water-soluble cellulose ether is preferably in powder form to be well dispersed in the first alcohol, more preferably in a powder form with the average particle size between 10 μm and 100 μm on a volume basis according to dry laser diffraction method.

<Step of Obtaining Dissolved Solution>

In the step of obtaining dissolved solution, the dispersion solution obtained in the step of obtaining dispersion solution is mixed with water to dissolve the water-soluble cellulose ether, resulting in a dissolved solution.

[Water]

While water is not particularly limited, examples of water include ion exchange water, distilled water, and tap water. So long as the water-soluble cellulose ether can be dissolved, an aqueous solution prepared by adding salts, water-soluble polymers, or other components to water may be used.

The content of water may be set as appropriate according to the amount of water-soluble cellulose ether, but the higher the amount of water is, the larger the amount of water-soluble cellulose ether dissolved is. The content of water may be equal to or more than an amount that enables the water-soluble cellulose ether used to be dissolved. For example, when the alcohol is ethanol or isopropanol, the water content is preferably in the range between 4.9% by mass (m/m) and 69.9% by mass relative to the total mass of the alcohol composition, more preferably between 4.9% by mass and 59.9% by mass, still more preferably between 4.9% by mass and 49.9% by mass, and still even more preferably between 4.9% by mass and 39.9% by mass. When the alcohol is glycerin, diglycerin, or a mixture of glycerin and diglycerin, the content is preferably in the range between 26% by mass and 79.9% by mass relative to the total mass of the alcohol composition, more preferably between 36% by mass and 79.9% by mass, and still more preferably between 46% by mass and 79.9% by mass.

While the temperature of water may be set as appropriate depending on the type of water-soluble cellulose ether, the temperature is, for example, in the range between 0° C. and 35° C. Taking into consideration that the lower temperature the water-soluble cellulose ether is at, the higher solubility the water-soluble cellulose ether has, the temperature is preferably in the range between 0° C. and 30° C., and more preferably between 0° C. and 20° C.

[Process Conditions]

The conditions for mixing the dispersion solution with water to dissolve the water-soluble cellulose ether are not particularly limited. Examples of the conditions include conditions for dissolving a substance contained in a dispersion solution in water as known in the art. For example, from the viewpoint of workability, it is preferable to add water to the dispersion solution followed by subjecting the resultant to mixing treatment.

As mixing treatment, it is preferable to employ stirring treatment. The stirring means are not particularly limited. Examples of stirring means include stirring means using stirring devices such as homogenizer, homomixer, homodisper, flowjet mixer, ultramixer, colloid mill, and three-one motor. The stirring means may be the same stirring means employed in the step of obtaining dispersion solution, or may be the different stirring means.

The stirring temperature is not particularly limited, so long as the temperature allows the water-soluble cellulose ether to be dissolved. The temperature is preferably in the range between 0° C. and 35° C., and more preferably between 0° C. and 25° C. The stirring time is not particularly limited, so long as the time is a time when the dissolution of water-soluble cellulose ether is completed. The time is preferably in the range between 10 minutes and 60 minutes.

In the step of obtaining dissolved solution, it is possible to say that the dissolved solution has been obtained by visually confirming that there are virtually no separation or precipitation of water-soluble cellulose ether. In the step of obtaining dissolved solution, part or all of the step may be carried out while cooling in order to improve the solubility of water-soluble cellulose ether.

<Step of Obtaining Alcohol Composition>

In the step of obtaining alcohol composition, the alcohol composition is obtained by mixing the dissolved solution obtained in the step of obtaining dissolved solution with the second alcohol.

[Second Alcohol]

As described above, the second alcohol may be the same alcohol as the first alcohol or may be the different alcohol from the first alcohol. The content of alcohol is not particularly limited. In order to achieve sufficient hydration of the water-soluble cellulose ether in the alcohol composition, the ratio of the mass of the first alcohol relative to the total mass of the first and second alcohols ([first alcohol]/[first alcohol+ second alcohol]) is preferably equal to or less than 0.70.

[Process Conditions]

The conditions for mixing the dissolved solution with the second alcohol to obtain an alcohol composition are not particularly limited. Examples of the conditions include conditions for mixing two types of liquids as known in the art. For example, from the viewpoint of workability, it is preferable to add the second alcohol to the dissolved solution followed by subjecting the resultant to stirring treatment or other mixing treatment. The stirring means are not particularly limited. Examples of stirring means include stirring means using stirring devices such as homogenizer, homomixer, homodisper, flowjet mixer, ultramixer, colloid mill, and three-one motor. The stirring means may be the same stirring means as employed in the step of obtaining dispersion solution and/or the step of obtaining dissolved solution, or may be the different stirring means. In addition, in order to improve the solubility stability of water-soluble cellulose ether in the alcohol composition and the uniformity of each component in the alcohol composition, it is preferable to subject the dissolved solution and the second alcohol to strong mixing treatment, it is more preferable to subject the dissolved solution and the second alcohol to vigorous mixing treatment, and it is still more preferable to subject the dissolved solution and the second alcohol to homogenizing treatment.

The stirring temperature is not particularly limited, but preferably in the range between 0° C. and 35° C., and more preferably between 0° C. and 25° C. The stirring time is not particularly limited, but preferably in the range between 20 minutes and 90 minutes.

In the step of obtaining alcohol composition, it is possible to say that the alcohol composition has been obtained by visually confirming that there are virtually no separation or precipitation of water-soluble cellulose ether. If the dissolution of water-soluble cellulose ether is insufficient, the separated or precipitated portion of water-soluble cellulose ether tends to settle out when the alcohol composition is allowed to stand for one week. Therefore, it is preferable that in the alcohol composition, no separated or precipitated water-soluble cellulose ether can be substantially observed when the composition is allowed to stand for one week. In the step of obtaining alcohol composition, part or all of the step may be carried out while cooling in order to improve the solubility of water-soluble cellulose ether.

The method according to one embodiment of the present invention may include various steps and manipulations before, after, or during the above steps, so long as it can solve the problems of the present invention. However, it is preferable that the step of obtaining dispersion solution, the step of dissolved solution, and the step of obtaining alcohol composition be carried out continuously without any other processes in between them.

<Alcohol Composition>

The alcohol composition obtained by the method according to one embodiment of the present invention is not particularly limited in terms of the physical properties and applications so long as it is one produced by the method according to one embodiment of the present invention. By carrying out the method according to one embodiment of the present invention, the resulting alcohol composition may be produced within a wide range of viscosities. For example, the alcohol composition may have a viscosity at 20° C. of 100 mPa·s to 50,000 mPa·s, thereby taking the gel form, liquid form, or other forms.

By carrying out the method according to one embodiment of the present invention, the resulting alcohol composition may have a smaller loss tangent (tan δ) and/or a higher transmittance. For example, the alcohol composition can be produced to have a loss tangent (tan δ) of 0.05 to 5.00 from the viewpoint of providing a good application feeling. Furthermore, if the alcohol composition is produced to have a loss tangent (tan δ) of 1.00 or less, the alcohol composition may take a gel-like form which can be prevented from dripping out and have no sticky feeling but an excellent application feeling. For example, the alcohol composition can be produced to have a transmittance of 10.0% to 99.0%. Furthermore, if the alcohol composition is produced to have a transmittance equal to or more than 65.0%, the alcohol composition may become highly transparent to make a good appearance.

The method according to one embodiment of the present invention can produce an alcohol composition having a loss tangent (tan δ) of 1.00 or less, and a transmittance of 65.0% or more. Such an alcohol composition is useful as a gel-like form alcohol composition with both excellent viscoelasticity and high transparency.

Furthermore, by increasing the alcohol content to 60.0% by mass or more, such an alcohol composition is useful as a gel-like form alcohol disinfectant composition with excellent viscoelasticity and high transparency as well as disinfecting property. In addition, by employing glycerin as an alcohol, such an alcohol composition is useful as a gel-like form alcohol-containing cosmetic composition with excellent viscoelasticity and high transparency as well as moisturizing property.

The viscosity, loss tangent (tan δ) and transmittance of alcohol composition are the value measured by the method as described in Examples below, respectively. The liquid dripping and application feeling of alcohol composition are evaluated by the method as described in Examples below, respectively.

Resulting from extensive studies, the present inventors have found out that an alcohol composition having not only a desired viscosity but also a low loss tangent (tan δ) and/or high transmittance can be produced by setting the degree of substitutions of methoxy groups (DS) and the molar substitutions of hydroxypropoxy groups (MS) in the water-soluble cellulose ether, the alcohol concentration (% by mass; X), and the first alcohol content ratio (%; Y) so as to become in a certain relationship.

That is, with the use of the method according to one embodiment of the present invention, if DS, MS, X, and Y, and Z which is calculated by the following formula using the values, are made to have the relationship described in Tables 1 to 3 below, an alcohol composition having a desired viscosity and a low loss tangent (tan δ) (Table 1), an alcohol composition having a desired viscosity and high transmittance (Table 2), and an alcohol composition having a desired viscosity, a low loss tangent (tan δ) and high transmittance (Table 3) can be produced.

$$(DS+MS)/X \times Y = Z (\text{wherein } X>Y)$$

In Tables 1 to 3, the water-soluble cellulose ether employed in Condition I is MC, and the water-soluble cellulose ethers employed in Conditions II to IV are HPMC. In addition, since each value of DS, MS, X, Y, and Z in Tables 1 to 3 is a rough indication, it should not be interpreted to mean that each alcohol composition cannot be produced unless DS, MS, X, Y, and Z are within the range of the values indicated in Tables 1 to 3.

TABLE 1

| Conditions | DS | MS | X | Y | Z |
|---|---|---|---|---|---|
| I | 1.00~2.20 | 0.00 | 43.0~80.0 | 10~70 | 0.21~3.10 |
| II | 1.50~2.20 | 0.15~0.35 | 43.0~93.0 | 10~70 | 0.22~3.50 |
| III | 1.50~2.20 | 0.10~0.21 | 43.0~80.0 | 10~70 | 0.22~3.15 |
| IV | 1.00~1.80 | 0.10~0.30 | 43.0~80.0 | 10~70 | 0.20~2.85 |

TABLE 2

| Conditions | DS | MS | X | Y | Z |
|---|---|---|---|---|---|
| I | 1.00~2.20 | 0.00 | 30.0~68.0 | 10~70 | 0.25~2.40 |
| II | 1.50~2.20 | 0.15~0.35 | 30.0~88.0 | 10~70 | 0.23~2.60 |
| III | 1.50~2.20 | 0.10~0.21 | 30.0~75.0 | 10~70 | 0.22~2.30 |
| IV | 1.00~1.80 | 0.10~0.30 | 30.0~70.0 | 10~70 | 0.21~2.10 |

TABLE 3

| Conditions | DS | MS | X | Y | Z |
|---|---|---|---|---|---|
| I | 1.00~2.20 | 0.00 | 43.0~80.0 | 10~70 | 0.24~3.10 |
| II | 1.50~2.20 | 0.15~0.35 | 43.0~88.0 | 10~70 | 0.23~3.50 |
| III | 1.50~2.20 | 0.10~0.21 | 43.0~75.0 | 10~70 | 0.22~3.15 |
| IV | 1.00~1.80 | 0.10~0.30 | 43.0~70.0 | 10~70 | 0.21~2.85 |

In Tables 1 to 3, DS and MS in HPMC employed in Conditions II to IV are preferably in a certain relationship in terms of the solubility of HPMC in the alcohol composition and the thickening property imparted to the alcohol composition. For example, HPMC employed in Condition II preferably has a DS of 1.60 to 2.10 and an MS of 0.17 to 0.30; HPMC employed in Condition III preferably has a DS of 1.60 to 2.10 and an MS of 0.12 to 0.21; and HPMC employed in Condition IV preferably has a DS of 1.20 to 1.70 and an MS of 0.17 to 0.30.

The alcohol composition according to one embodiment of the present invention may contain other additives in addition to HPMC, MC, alcohol, and water in order to impart desired properties to the alcohol composition.

Additives are not particularly limited so long as they do not prevent the present invention from solving the problems, but may include, for example, disinfectants, viscosity modifying agents, pH adjusting agents, fragrances, pigments, dyes, antioxidants, preservative agents, and moisturizers.

Examples of disinfectants include benzalkonium chloride, triclosan, and hinokitiol.

Examples of viscosity modifying agents include water-soluble polymers such as guar gum, locust bean gum, carboxymethyl cellulose, hydroxyethyl cellulose, hydrophobized hydroxypropyl methyl cellulose, cationized hydroxyethyl cellulose, carboxyvinyl polymer, and polyvinyl alcohol.

Examples of pH adjusting agents include alkaline metal hydroxides such as sodium hydroxide and potassium hydroxide; alkaline earth metal hydroxides such as calcium hydroxide and magnesium hydroxide; ammonium carbonate, ammonia, ammonia water, trisodium phosphate, disodium hydrogen phosphate, dipotassium hydrogen phosphate; secondary alkylamines such as dimethylamine and diethylamine; tertiary alkylamines such as trimethylamine and triethylamine; monoethanolamine, isopropanolamine, diethanolamine, diisopropanolamine, triethanolamine, triisopropanolamine, and polyethanolamine.

Examples of fragrances include rose oil, jasmine oil, lavender oil, ylang-ylang oil, peppermint oil, geranium oil, patchouli oil, sandalwood oil, cinnamon oil, lemon oil, orange oil, bergamot oil, limonene, β-caryophyllene, cis-3-hexenol, linalool, farnesol, β-phenylethyl alcohol, 2,6-nonadienal, citral, α-hexyl cinnamaldehyde, iota-carvone, cyclopentadecanone, linalyl acetate, γ-undecalactone, and aurantiol.

Examples of pigments include titanium dioxide, zinc oxide, barium sulfate, zinc oxide coated or compounded with silicic anhydride, iron oxide (bengara), iron titanate, γ-iron oxide, iron yellow oxide, ochre, black iron oxide, carbon black, and low-order titanium dioxide.

Examples of dyes include acid dyes, nitro dyes, disperse dyes, basic dyes, and oxidative dye intermediates.

Examples of antioxidants include tocopherol, tocopherol acetate, ascorbic acid, butyl hydroxyanisole, and dibutyl hydroxytoluene.

Examples of preservative agents include methylparaben, ethylparaben, propylparaben, butylparaben, and phenoxyethanol.

Examples of moisturizers include hyaluronic acid, sodium hyaluronate, polyethylene glycol, mucopolysaccharide, urea, sorbitol, chondroitin sulfate, pyrrolidone carboxylic acid, sodium lactate, and polyaspartic acid.

Additives may be used either individually or in combination of two or more of the above-mentioned additives. Additives may be commercially available or may be manufactured by known methods.

The content of additives may vary according to the desired properties and applications to be given to the alcohol composition, but for example, from the viewpoint of the storage stability of the alcohol composition, the content is preferably in the range between 0.001% by mass and 20.0% by mass.

<Kit>

According to another aspect of the present invention, there is provided a kit for producing an alcohol composition, used to carry out the method according to one embodiment of the present invention. The kit according to one embodiment of the present invention contains at least one water-soluble cellulose ether selected from the group consisting of hydroxypropyl methylcellulose and methylcellulose, the first alcohol, and the second alcohol. In the kit, the ratio of the mass of the first alcohol relative to the total mass of the first and second alcohols ([first alcohol]/[first alcohol+second alcohol]) is equal to or less than 0.70, preferable equal to or less than 0.61.

The kit according to one embodiment of the present invention may contain other components in addition to the water-soluble cellulose ether, the first alcohol, and the second alcohol. Other components include, but are not limited to, water; additives such as disinfectants, viscosity modifying agents, pH adjusting agents, fragrances, pigments, dyes, antioxidants, preservative agents, and moisturizers.

In the kit according to one embodiment of the present invention, each component is preferably put into a separate container, but for example, the first alcohol and the second alcohol may be put into the same container. If the first and second alcohols are put into the same container, it is preferable to, for example, mark the container containing the alcohol with a marker so that the amount of each alcohol can be indicated to make sure that the mass of the first alcohol and the mass of the second alcohol are in the above-mentioned mass ratio.

For the kit according to one embodiment of the present invention, the container for each component is not particularly limited. Examples of such container include a packaging container made of metal such as aluminum, paper, plastic such as polyethylene terephthalate and Press Through Package (PTP), or glass. The kit according to one embodiment of the present invention is preferred to contain a package or instructions for carrying out the method of one embodiment of the present invention.

The invention further encompasses the following items:
1. A method of producing an alcohol composition, comprising the steps of dispersing at least one water-soluble cellulose ether selected from the group consisting of hydroxypropyl methylcellulose and methylcellulose in a first alcohol to obtain a dispersion solution;
   mixing the dispersion solution with water and dissolving the water-soluble cellulose ether to obtain a dissolved solution; and
   mixing the dissolved solution with a second alcohol to obtain an alcohol composition.
2. The method of producing an alcohol composition according to claim 1, wherein the ratio of the mass of the first alcohol relative to the total mass of the first and second alcohols ([first alcohol]/[first alcohol+second alcohol]) is equal to or less than 0.70.
3. The method of producing an alcohol composition according to claim 1 or 2, wherein the first alcohol and/or the second alcohol is at least one alcohol selected from the group consisting of lower alcohols with 1 to 4 carbon atoms, and polyhydric alcohols.
4. The method of producing an alcohol composition according to claim 1 or 2, wherein the first alcohol and/or the second alcohol is at least one alcohol selected from the group consisting of ethanol, isopropanol and glycerin.
5. The method of producing an alcohol composition according to claim 1 or 2, wherein the first alcohol and/or the second alcohol is ethanol, and the total content of alcohols is in the range between 60.0% by mass and 90.0% by mass.

6. A kit for producing an alcohol composition, comprising at least one water-soluble cellulose ether selected from the group consisting of hydroxypropyl methylcellulose and methylcellulose, a first alcohol, and a second alcohol; and wherein the ratio of the mass of the first alcohol relative to the total mass of the first and second alcohols ([first alcohol]/[first alcohol+second alcohol]) is equal to or less than 0.70.

EXAMPLES

While the present invention will now be described in further detail with reference to examples and comparative examples, the present invention is not limited to what is described in these examples and comparative examples.

<Evaluation of Physical Properties>
[Viscosity of HPMC and MC]

With respect to each viscosity of HPMC and MC, the viscosity at 20° C. of 2.0% by mass aqueous solution of each water-soluble cellulose ether was determined by using a single cylindrical rotational viscometer according to the single rotational viscometer in the General Tests "Viscosity Determination" in The Japanese Pharmacopoeia, Seventeenth Edition.

[Viscosity of Alcohol Composition]

The viscosity of the alcohol composition was determined as the value when measured after 120 seconds at 30 rpm at 20° C. using a single cylinder viscometer ("DVM-BII" manufactured by Tokyo Keiki, rotor Nos. 2 to 4). If the viscosity is beyond 20,000 mPa·s, the viscosity was determined as the value when measured after 120 seconds at 20 rpm at 20° C. using a Brookfield type viscometer ("B8H" manufactured by Tokyo Keiki, rotor No. 5).

[Loss Tangent]

The loss tangent was measured for the alcohol composition using a rheometer ("MCR-301" manufactured by Anton Paar) in the following procedures.

The sample measurement section of the rheometer was pre-tempered to 25° C. The alcohol composition was poured into the CC27 measuring cup (a cylindrical aluminum container with a diameter of 30 mm and a height of 80 mm) up to the marked line (25 ml). The viscoelasticity of the alcohol composition poured into the measuring cup was measured by a bob cylinder (26.7 mm in diameter and 40.0 mm in height: CC27) at a frequency of 1 Hz when strain was applied in the range between 0.01% and 100.0%. The measurement section was kept constant at 25° C. The measured value of viscoelasticity was employed as the value of loss tangent.

[Transmittance]

The transmittance as a measure of transparency was measured at 720 nm for the alcohol composition at 20° C. using a photoelectric colorimeter ("PC-50" manufactured by KOTAKI) with a filter of 720 nm and a 20 mm cell.

[Liquid Dripping]

The alcohol composition was filled up in a dispenser container ("200 ml pump bottle", bore diameter: 3 mm, manufactured by FRCOLOR). Liquid dripping was evaluated by dispensing the alcohol composition as a gel three times consecutively from the dispenser container, and visually checking the liquid dripping, according to the following evaluation criteria.

<<Evaluation Criteria>>
—: No liquid dripping was confirmed.
+: The liquid dripping was confirmed one time out of three times.
++: The liquid dripping was confirmed two times out of three times.
+++: The liquid dripping was confirmed all three times.

<Sensory Evaluation>
[Application Feeling]

The application feeling was confirmed by sensory evaluation directed to five panelists who excelled in evaluating the feeling for alcohol composition, according to the following method.

That is, the feeling for alcohol composition at the time when 5 ml of alcohol composition was placed on the back of hand of each panelist and applied to the entire hand was scored according to the following evaluation criteria-a. Then, the score with the highest number of respondents (the most frequent score) was adopted as the application feeling. In addition, since the composition with a loss tangent of more than 1.0 and a transmittance of 65.0% or more had no effect on application feeling, another evaluation criteria (evaluation criteria-b) was adopted.

<<Evaluation Criteria-a>>
3: Good extensibility, no sticky feeling, and less dry feeling.
2: Good extensibility, and moist application feeling.
1: Sticky feeling.
0: Poor extensibility, or difficulty in application due to spilling down from hands.

<<Evaluation Criteria-b>>
2: Capable of applying due to no spilling down from hands, and less sticky feeling.
1: Capable of applying due to no spilling down from hands.
0: Difficult in applying due to spilling down from hands.

<Method of Producing Alcohol Composition>
[Materials Used]

For HPMC and MC, the samples listed in Table 4 (all manufactured by Shin-Etsu Chemical) were used. Ethanol (Fujifilm Wako Pure Chemical), isopropanol (Kishida), and glycerin (Kishida) were used as alcohols. Pure water was used for water.

TABLE 4

| Samples | Type | Degree of substitutions (DS) | Molar substitutions (MS) | Viscosity of 2% by mass aqueous solution (mPa·s) |
| --- | --- | --- | --- | --- |
| CE-1 | MC | 1.79 | — | 4850 |
| CE-2 | MC | 1.81 | — | 8120 |
| CE-3 | HPMC | 1.87 | 0.24 | 4500 |
| CE-4 | HPMC | 1.87 | 0.25 | 10100 |
| CE-5 | HPMC | 1.75 | 0.16 | 4880 |
| CE-6 | HPMC | 1.75 | 0.15 | 13700 |
| CE-7 | HPMC | 1.76 | 0.16 | 58600 |
| CE-8 | HPMC | 1.46 | 0.25 | 4950 |
| CE-9 | HPMC | 1.43 | 0.2 | 13100 |
| CE-10 | HPMC | 1.48 | 0.25 | 85000 |
| CE-11 | HPMC | 1.76 | 0.15 | 1490 |

Example 1

Ethanol (20.0 g) accurately weighed as a first alcohol and CE-1 (2.0 g) were added to a 200 ml beaker, and the mixture was stirred for 2 min using a magnetic stirrer ("HS-360" manufactured by As One, 200 rpm to 300 rpm) to prepare a uniform dispersion solution. Then, while stirring, pure water (28.0 g) at 20° C. was added to the resulting dispersion solution to dissolve MC, and obtain a dissolved solution. Ethanol (50.0 g) as a second alcohol was added to the resulting dissolved solution, and the mixture was subjected to homogenization treatment for 4 minutes using a small homogenizer ("AHG-160D" manufactured by As One, 5,000 rpm) to produce the alcohol composition of Example 1.

Examples 2 to 24 and 26 to 39

The alcohol compositions of Examples 2 to 24, and 26 to 36 were produced in the same manner as in Example 1, except that the types and amounts of alcohols and samples shown in Table 5 were used.

Example 25

Carboxyvinyl polymer (2.0 g) was added to pure water (98.0 g) and dissolved using a homomixer ("HM-310" manufactured by As One) to prepare a 2% by mass aqueous solution of carboxyvinyl polymer (carbomer).
Ethanol (20.0 g) accurately weighed and hydroxypropyl methylcellulose (2.0 g) were added to a 200 ml beaker, and the mixture was stirred for 2 minutes using a magnetic stirrer ("HS-360" manufactured by As One, 200 rpm to 300 rpm) to prepare a uniform dispersion solution. Then, with stirring, pure water (17.8 g) at 20° C. and 2% by mass aqueous solution of carbomer (10.0 g) were added to the resulting dispersion solution to dissolve HPMC, and to obtain a dissolved solution. Ethanol (50.0 g) was added to the resulting dissolved solution, and the mixture was subjected to homogenization treatment for 4 minutes using a small homogenizer ("AHG-160D" manufactured by As One, 5,000 rpm). Triethanolamine was added to the homogenized mixture to adjust pH at 6 to 8, resulting in the alcohol composition of Example 25.

Example 40

Ethanol (20.0 g) accurately weighed and hydroxypropyl methylcellulose (2.0 g) were added to a 200 ml beaker, and the mixture was stirred for 2 min using a magnetic stirrer ("HS-360" manufactured by As One, 200 rpm to 300 rpm) to prepare a uniform dispersion solution. Then, with stirring, pure water (26.0 g) at 20° C. was added to the resulting dispersion solution to dissolve HPMC, and to obtain a dissolved solution. Ethanol (50.0 g) and glycerin (2.0 g) were added to the resulting dissolved solution, and the mixture was subjected to homogenization treatment for 4 minutes using a small homogenizer ("AHG-160D" manufactured by As One, 5,000 rpm) to produce the alcohol composition of Example 40.

Comparative Examples 1 to 3

The alcohol compositions of Comparative Examples 1 to 3 were produced in the same manner as in Example 1, except that the types and amounts of alcohols and samples shown in Table 5 were used. However, no second alcohol was used in producing the alcohol compositions of Comparative Examples 1 and 2, and no first alcohol was used in producing the alcohol composition of Comparative Example 3.

<Evaluation Results>

Table 5 and Table 6 show the results of evaluating the viscosity, loss tangent, transmittance, liquid dripping, and application feeling of the alcohol compositions of Examples 1 to 40.

The method of producing an alcohol composition in Examples 1 to 40 did not use hot water so that the step of cooling hot water could not be required, and the working time and power consumption could be reduced. Since the aqueous solution of HPMC or MC was not prepared beforehand, it was possible to prepare the alcohol compositions in one pot.

The alcohol compositions of Examples 1 to 40 were produced with a variety of alcohols, in which HPMC or MC was well dissolved, so that the viscosity could be adjusted over a wide range from 629 mPa·s to 25,250 mPa·s.

In contrast, in the alcohol compositions of Comparative Examples 1 and 2, HPMC was not almost dissolved, and the precipitated HPMC settled out one week after left to stand. When HPMC powder was added to water in producing the alcohol composition of Comparative Example 3, the surface of the powder agglomeration dissolved first, and water did not penetrate to the inside of the agglomeration, resulting in the so-called mamako (agglomerates). The alcohol compositions of Comparative Examples 1 to 3 had not only poor appearance but also insufficient thickening property to the extent that the viscosity measurement could not be performed due to the undissolved HPMC.

Among the alcohol compositions of Examples 1 to 40, some alcohol compositions had a loss tangent equal to or less than 1.00, thereby leading to the contribution of elasticity exceeding that of viscosity and retaining an excellent gel morphology. As a result, the alcohol compositions were not dripped out from the container, and could be applied on the entire hand without spilling down when placed on the hand. Most of the alcohol compositions with a loss tangent of 1.00 or less had good extensibility, were easy to spread, and had a good application feeling with little stickiness.

Among the alcohol compositions of Examples 1 to 40, some alcohol compositions had a transmittance equal to or more than 65.0%, thereby being highly transparent and having good appearance. Furthermore, some alcohol compositions had a transmittance or 65.0% or more, and a loss tangent of 1.00 or less, thereby having a smooth liquid feeling but a weak gel feeling, and being able to be applied without spilling down from the hand.

Among the alcohol compositions of Examples 1 to 40, some alcohol compositions had a loss tangent of 1.00 or less and a transmittance of 65.0% or more, thereby retaining an excellent gel morphology, having no liquid dripping, being highly transparent, having good appearance, and having an excellent application feeling.

Among the alcohol compositions of Examples 1 to 40, the alcohol composition containing glycerin as an alcohol had good properties as well as had a moisturizing feeling and a good application feeling.

In addition, the alcohol compositions of Examples 1 to 40 all contained the water-soluble cellulose ether at the sufficiently dissolved state, and thus had almost the same viscosity as immediately after preparation even after left to stand at room temperature for one week. Accordingly, these results show that the water-soluble cellulose ethers were almost insoluble in alcohols, but contained in the alcohol compositions at the well-dissolved state.

TABLE 5

| Examples | Alcohol(s) | Sample | Type | Content of sample (parts by mass) | Viscosity (mPa·s) | Content of alcohol (% by mass) [A] | Content of first alcohol (% by mass) [B] | First alcohol content ratio (%) [B]/[A] | Loss tangent | Transmittance (%) |
|---|---|---|---|---|---|---|---|---|---|---|
| 1 | Ethanol | CE-1 | MC | 2.0 | 15,160 | 70.0 | 20.0 | 28.6 | 0.43 | 46.4 |
| 2 | Ethanol | CE-1 | MC | 2.0 | 3,010 | 80.0 | 20.0 | 25.0 | 0.22 | 14.7 |
| 3 | Ethanol | CE-2 | MC | 1.5 | 2,510 | 70.0 | 30.0 | 42.9 | 1.00 | 48.2 |
| 4 | Ethanol | CE-8 | HPMC | 2.0 | 8,020 | 60.0 | 20.0 | 33.3 | 0.87 | 77.4 |
| 5 | Ethanol | CE-9 | HPMC | 1.5 | 6,400 | 60.0 | 20.0 | 33.3 | 0.87 | 78.0 |
| 6 | Ethanol | CE-10 | HPMC | 1.0 | 3,260 | 70.0 | 40.0 | 57.1 | 0.77 | 55.4 |
| 7 | Ethanol | CE-8 | HPMC | 2.0 | 4,780 | 80.0 | 20.0 | 25.0 | 0.19 | 14.1 |
| 8 | Ethanol | CE-7 | HPMC | 1.0 | 5,210 | 75.0 | 20.0 | 26.7 | 0.79 | 86.5 |
| 9 | Ethanol | CE-6 | HPMC | 1.5 | 3,930 | 80.0 | 40.0 | 50.0 | 0.56 | 37.6 |
| 10 | Ethanol | CE-5 | HPMC | 2.0 | 13,480 | 80.0 | 20.0 | 25.0 | 0.56 | 24.1 |
| 11 | Ethanol | CE-5 | HPMC | 2.0 | 7,570 | 90.0 | 20.0 | 22.2 | 0.39 | 33.6 |
| 12 | Ethanol | CE-1 | MC | 2.0 | 10,680 | 60.0 | 20.0 | 33.3 | 1.21 | 70.1 |
| 13 | Ethanol | CE-1 | MC | 2.0 | 12,370 | 60.0 | 30.0 | 50.0 | 0.95 | 67.6 |
| 14 | Ethanol | CE-4 | HPMC | 1.5 | 3,363 | 60.0 | 20.0 | 33.3 | 1.89 | 99.0 |
| 15 | Ethanol | CE-4 | HPMC | 2.0 | 9,350 | 85.0 | 20.0 | 23.5 | 0.88 | 82.5 |
| 16 | Ethanol | CE-4 | HPMC | 1.5 | 3,170 | 85.0 | 40.0 | 47.1 | 1.90 | 78.8 |
| 17 | Ethanol | CE-3 | HPMC | 2.0 | 4,050 | 70.0 | 20.0 | 28.6 | 2.25 | 98.7 |
| 18 | Ethanol | CE-3 | HPMC | 2.0 | 4,710 | 80.0 | 20.4 | 25.5 | 1.81 | 91.2 |
| 19 | Ethanol | CE-6 | HPMC | 1.5 | 7,680 | 60.0 | 20.0 | 33.3 | 1.37 | 98.3 |
| 20 | Ethanol | CE-10 | HPMC | 1.0 | 4,120 | 60.0 | 35.0 | 58.3 | 3.40 | 78.6 |
| 21 | Ethanol | CE-10 | HPMC | 1.0 | 4,520 | 70.0 | 20.0 | 28.6 | 0.66 | 70.9 |
| 22 | Ethanol | CE-6 | HPMC | 1.5 | 9,350 | 70.0 | 20.0 | 28.6 | 0.99 | 96.2 |
| 23 | Ethanol | CE-6 | HPMC | 1.5 | 13,400 | 75.0 | 20.0 | 26.7 | 0.61 | 85.2 |
| 24 | Ethanol | CE-7 | HPMC | 1.0 | 2,740 | 75.0 | 40.0 | 53.3 | 0.89 | 71.8 |
| 25 | Ethanol | CE-8 | HPMC | 0.2 | 4,930 | 70.0 | 20.0 | 28.6 | 0.30 | 92.4 |
| 26 | Glycerin | CE-7 | HPMC | 1.0 | 5,780 | 45.0 | 22.5 | 50.0 | 0.33 | 84.6 |
| 27 | Glycerin | CE-7 | HPMC | 1.0 | 629 | 45.0 | 27.0 | 60.0 | 0.58 | 56.5 |
| 28 | Isopropanol | CE-1 | MC | 1.5 | 2,661 | 60.0 | 20.0 | 33.3 | 1.63 | 74.5 |
| 29 | Isopropanol | CE-2 | MC | 1.5 | 5,330 | 65.0 | 20.0 | 30.8 | 0.79 | 63.6 |
| 30 | Isopropanol | CE-8 | HPMC | 2.0 | 23,000 | 60.0 | 20.0 | 33.3 | 0.55 | 76.2 |
| 31 | Isopropanol | CE-7 | HPMC | 1.0 | 6,980 | 70.0 | 20.0 | 28.6 | 0.68 | 95.5 |
| 32 | Isopropanol | CE-3 | HPMC | 2.0 | 13,710 | 85.0 | 20.0 | 23.5 | 0.72 | 63.2 |
| 33 | Isopropanol | CE-3 | HPMC | 2.0 | 6,350 | 80.0 | 20.0 | 25.0 | 1.55 | 88.9 |
| 34 | Isopropanol | CE-7 | HPMC | 1.5 | 3,746 | 75.0 | 42.9 | 57.1 | 1.24 | 86.2 |
| 35 | Isopropanol | CE-5 | HPMC | 2.0 | 5,460 | 60.0 | 20.0 | 33.3 | 1.78 | 99.5 |
| 36 | Isopropanol | CE-2 | MC | 1.5 | 3,930 | 50.0 | 30.0 | 60.0 | 1.65 | 82.3 |
| 37 | Isopropanol | CE-5 | HPMC | 2.0 | 15,360 | 70.0 | 20.0 | 28.6 | 0.36 | 85.7 |
| 38 | Ethanol | CE-11 | HPMC | 3.0 | 22,500 | 80.0 | 20.0 | 25.0 | 0.49 | 31.0 |
| 39 | Ethanol | CE-11 | HPMC | 3.0 | 25,250 | 75.0 | 20.0 | 26.7 | 0.42 | 74.5 |
| 40 | Ethanol/Glycerin | CE-5 | HPMC | 2.0 | 10,070 | Ethanol70.0 Glycerin2.0 | 20.6 | 28.6 | 1.26 | 86.5 |

| Reference Example | Alcohol | Sample | Type | Content of sample (parts by mass) | HPMC Property | Content of alcohol (% by mass) [A] | Content of first alcohol (% by mass) [B] | First alcohol content ratio (%) [B]/[A] | Loss tangent | Transmittance (%) |
|---|---|---|---|---|---|---|---|---|---|---|
| 1 | Ethanol | CE-7 | HPMC | 1.0 | Separated | 75.0 | 75.0 | 100.0 | — | — |
| 2 | Ethanol | CE-8 | HPMC | 2.0 | Separated | 60.0 | 60.0 | 100.0 | — | — |
| 3 | Ethanol | CE-3 | HPMC | 2.0 | Agglomerated | 60.0 | 0.0 | 0.0 | — | — |

TABLE 6

| Examples | Liquid dripping | Application feeling Evaluation criteria-a | Application feeling Evaluation criteria-b |
|---|---|---|---|
| 1 | − | 3 | |
| 2 | − | 3 | |
| 3 | − | 2 | |
| 4 | − | 2 | |
| 5 | − | 2 | |
| 6 | − | 3 | |
| 7 | − | 3 | |
| 8 | − | 3 | |
| 9 | − | 3 | |
| 10 | − | 3 | |
| 11 | − | 3 | |
| 12 | + | | 2 |
| 13 | − | 2 | |
| 14 | + | | 1 |
| 15 | − | 2 | |
| 16 | + | | 1 |
| 17 | ++ | | 1 |
| 18 | + | | 1 |
| 19 | + | | 2 |
| 20 | ++ | | 1 |
| 21 | − | 3 | |
| 22 | − | 2 | |
| 23 | − | 3 | |
| 24 | − | 2 | |
| 25 | − | 3 | |
| 26 | − | 3 | |
| 27 | − | 3 | |
| 28 | + | | 1 |
| 29 | − | 3 | |
| 30 | − | 3 | |

TABLE 6-continued

| Examples | Liquid dripping | Application feeling | |
|---|---|---|---|
| | | Evaluation criteria-a | Evaluation criteria-b |
| 31 | − | 3 | |
| 32 | − | 3 | |
| 33 | + | | 2 |
| 34 | + | | 2 |
| 35 | + | | 1 |
| 36 | + | | 1 |
| 37 | − | 3 | |
| 38 | − | 3 | |
| 39 | − | 3 | |
| 40 | + | | 2 |

We claim:

1. A method of producing an alcohol composition, comprising the steps of dispersing at least one water-soluble cellulose ether selected from the group consisting of hydroxypropyl methylcellulose (HPMC) and methylcellulose (MC) in a first alcohol to obtain a dispersion solution;
   mixing the dispersion solution with water and dissolving the water-soluble cellulose ether to obtain a dissolved solution; and
   mixing the dissolved solution with a second alcohol to obtain an alcohol composition, and wherein the alcohol composition does not comprise a maleic anhydride polymer.

2. The method of producing an alcohol composition according to claim 1, wherein the ratio of the mass of the first alcohol relative to the total mass of the first and second alcohols ([first alcohol]/[first alcohol+second alcohol]) is equal to or less than 0.70.

3. The method of producing an alcohol composition according to claim 1, wherein the first alcohol and/or the second alcohol is at least one alcohol selected from the group consisting of lower alcohols with 1 to 4 carbon atoms, and polyhydric alcohols.

4. The method of producing an alcohol composition according to claim 1, wherein the first alcohol and/or the second alcohol is at least one alcohol selected from the group consisting of ethanol, isopropanol and glycerin.

5. The method of producing an alcohol composition according to claim 1, wherein the first alcohol and/or the second alcohol is ethanol, and the total content of alcohols is in the range between 60.0% by mass and 90.0% by mass.

6. The method according to claim 1, wherein the water-soluble cellulose ether is characterized by the following parameters:
   a. the degree of substitution (DS) of methoxy groups in HPMC is ≥1.00; or
   b. the molar substitution (MS) of hydroxypropoxy groups in HPMC is ≥0.1; or
   c. the DS of methoxy groups in MC is from 1.00 to 2.20.

7. The method according to claim 1, wherein the content of the water-soluble cellulose ether, relative to the total mass of the alcohol composition:
   a. for HPMC, ranges from 0.05% to 4.0% (m/m); or
   b. for MC, ranges from 0.05% (m/m) to 4.0%.

8. The method according to claim 1, wherein the water-soluble cellulose ether employed in the step of dispersing at least one water-soluble cellulose ether in a first alcohol, is a powder characterized by an average particle size between 10 m and 100 m.

9. The method according to claim 1, wherein the water content, relative to the total mass of the alcohol composition, ranges from 4.9% to 69.9% (m/m).

* * * * *